United States Patent [19]

Hoffrichter et al.

[11] Patent Number: 4,649,423
[45] Date of Patent: * Mar. 10, 1987

[54] METHOD AND CIRCUIT ARRANGEMENT FOR SELECTIVE CORRECTION OF HUES AND COLORS

[75] Inventors: Ingo Hoffrichter, Kiel; Eggert Jung, Schoenberg; Hans Keller, Kiel, all of Fed. Rep. of Germany

[73] Assignee: Dr. Ing. Rudolf Hell GmbH, Fed. Rep. of Germany

[*] Notice: The portion of the term of this patent subsequent to Dec. 23, 2003 has been disclaimed.

[21] Appl. No.: 680,775

[22] Filed: Dec. 12, 1984

[30] Foreign Application Priority Data

Dec. 14, 1983 [EP] European Pat. Off. ............ 83112579

[51] Int. Cl.$^4$ .............................................. H04N 1/46
[52] U.S. Cl. ..................................................... 358/80
[58] Field of Search ......................................... 358/80

[56] References Cited
U.S. PATENT DOCUMENTS 4,194,839 3/1980 Knop ................................. 356/407
4,307,962 12/1981 Jung ..................................... 358/80

Primary Examiner—Michael A. Masinick
Assistant Examiner—Robert M. Bauer
Attorney, Agent, or Firm—Hill, Van Santen, Steadman & Simpson

[57] ABSTRACT

A method and circuit arrangement for selective correction of hues and colors in the production of color separations for polychromatic mixed printing. A hue signal identifying the hues of the scanned colors as well as a color saturation signal and a luminance signal are derived from the measured color value signals acquired when scanning the original. Hue signals, color saturation signals and luminance signals are limited such that they are respectively not equal to zero only for selectable regions. The region of the hue signal defines a hue to be selectively corrected, and all three regions of the signals define a color to be selectively corrected. At least one of the limited signals is combined with at least one of the unlimited signals to form the selective correction signals which are superimposed on the color signals to be corrected.

17 Claims, 13 Drawing Figures

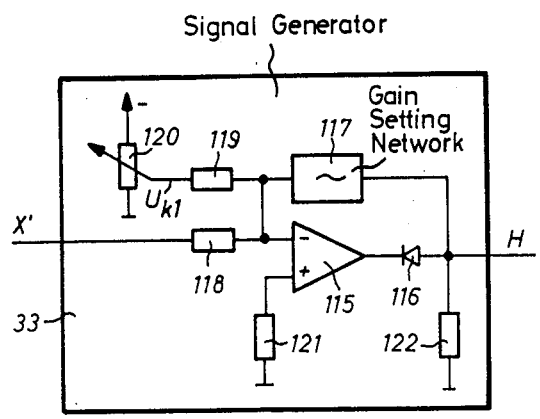
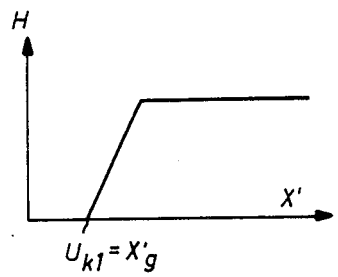
Fig.10a
Fig.10b
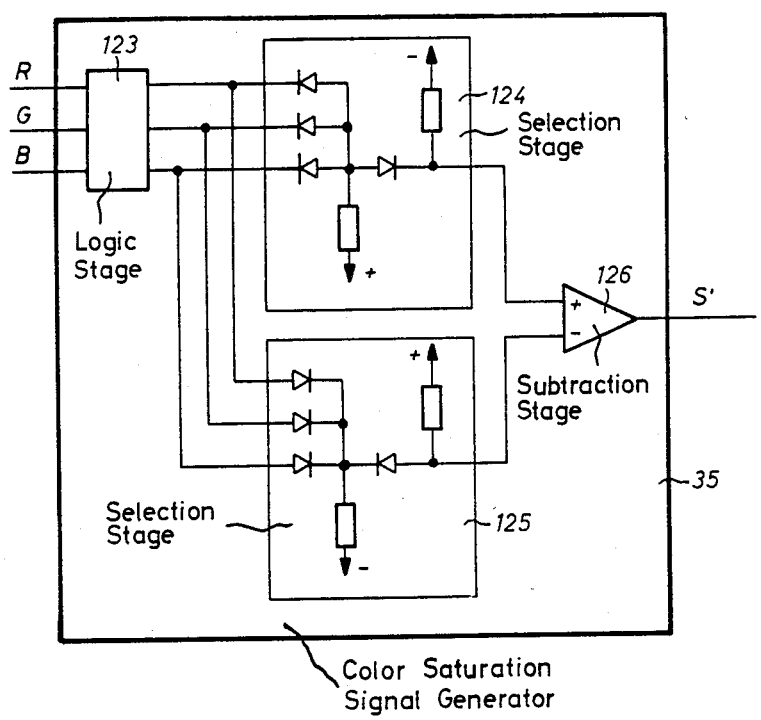
Fig.11

METHOD AND CIRCUIT ARRANGEMENT FOR SELECTIVE CORRECTION OF HUES AND COLORS

BACKGROUND OF THE INVENTION

In electronic reproduction technology, a method and circuit arrangement are provided for selective correction of hues and colors in a production of color separations for polychromatic mixed printing or multicolor printing.

In the production of color separations "yellow", "magenta", "cyan", and "black" for polychromatic mixed printing by use of a color scanner, color signals which are converted into color separation signals by means of a basic color correction are acquired by opto-electronic scanning of a color original. The color separation signals which are a measure for the intensity of the color application of the inks yellow, magenta, cyan, and black in the printing process are supplied to recording elements, for example lamps, whose brightnesses are modulated as a function of the color separation signals. The write lamps expose films as recording media point-by-point and line-by-line, these films representing the color separations "yellow", "magenta", "cyan" and "black" for the polychromatic mixed printing after they have been developed.

By use of the basic color correction among other things, color errors are eliminated which result because of different spectral properties of original colors and inks and, under given conditions, the desired edited chromatic information of the reproduction is altered in comparison to the original. In addition to the basic color correction, a selective color correction is often executed, and very specific colors or hues are corrected therewith.

In the selective color correction, the problem exists of generating selective correction signals which are only effective and influence the basic corrected color separation signals when the specific hues or colors to be corrected have been recognized in the color original.

When the color original to be reproduced has a color progression, i.e., differing color saturation and/or luminance within a color or a hue, selective correction signals whose intensity also depends on the color progression are required in order to achieve progressive gradually changing correction intensities.

An apparatus for selective color correction given a color scanner for the production of color separations for polychromatic mixed printing is already known from German Letters Pat. No. 26 28 053, corresponding to U.S. Pat. No. 4,194,839, incorporated herein by reference. A color recognition circuit is connected to receive the measured color value signals acquired in the scanning of the original. Within the color recognition circuit a recognition region for a color to be selectively corrected (correction color) in the color original is defined within the color space. The recognition circuit then selects the selected correction color from the other colors of the color original during the scanning of the original and always generates a selective correction signal when the selected correction color is recognized in the color original. The known apparatus has the disadvantage that it is essentially only prismatic color recognition spaces that can be defined. The color recognition spaces can therefore not be optimally matched in terms of shape and size to the color regions prescribed by the color progressions of the color original, so that the color recognition signal does not supply an unequivocal statement regarding the color saturation and/or luminance of the scanned colors. The desired progressive selective correction signals can thus likewise not be derived from the recognition signal.

A further disadvantage of the known apparatus for selective color correction is that the color recognition circuit is not specifically designed for the definition or for the recognition of hues, so that no optimum selective correction signals for hues can be generated.

SUMMARY OF THE INVENTION

It is an object of the invention to specify a method and a circuit arrangement for selective correction of hues and colors in the production of color separations for polychromatic mixed printing by which the hues to be corrected and the colors to be corrected can be optimally defined with respect to color gradation, color saturation, and luminance, and with which selective correction signals which exactly reproduce the color progressions of the hues and colors to be corrected are generated.

The invention also enables an exact separation in the selective correction of a hue selected for correction from its complementary hues or from hues in the gray range.

Since the physiological color sensation of many functions in terms of hue, color saturation, and luminance, and the generation of the selective correction signals in the invention also occurs separately according to hue, color saturation, and luminance, the invention also has the advantage that the effect of the selective correction signals can be checked by the operator.

According to the invention, measured color value signals (R, G, B) are transformed into chrominance signals (x,y) corresponding to a transformation of the RGB color space into a chrominance/luminance color space. A hue signal (T') is generated which identifies hues of the scanned colors from the chrominance signals (x, y). A color saturation signal (S') is derived identifying color saturation of the scanned colors, and a luminance signal (L') is derived identifying luminance of the scanned colors from the measured color value signals (R,G,B). The hue signal (T'), color saturation signal (S'), and luminance signal (L'), are all limited such that they are respectively unequal to zero only for selectable regions, the region of the limited, identifying hue signal (T*) defining a hue to be selectively corrected (T$_0$), and all three regions of the limited identifying hue, color saturation, and luminance signals (T*, S*, L*) defining a color to be selectively corrected. The selective correction signals (Y$_K$, M$_K$, C$_K$) are acquired based on at least one of the limited identifying signals (T*, S*, L*).

BRIEF DESCRIPTION OF THE DRAWINGS

FIG. 10a is an illustrative embodiment of a signal generator;

FIG. 10b is a graphic presentation of an output of the signal generator;

FIG. 11 is an illustrative embodiment of a color saturation signal generator.

DESCRIPTION OF THE PREFERRED EMBODIMENTS

Figure 1:
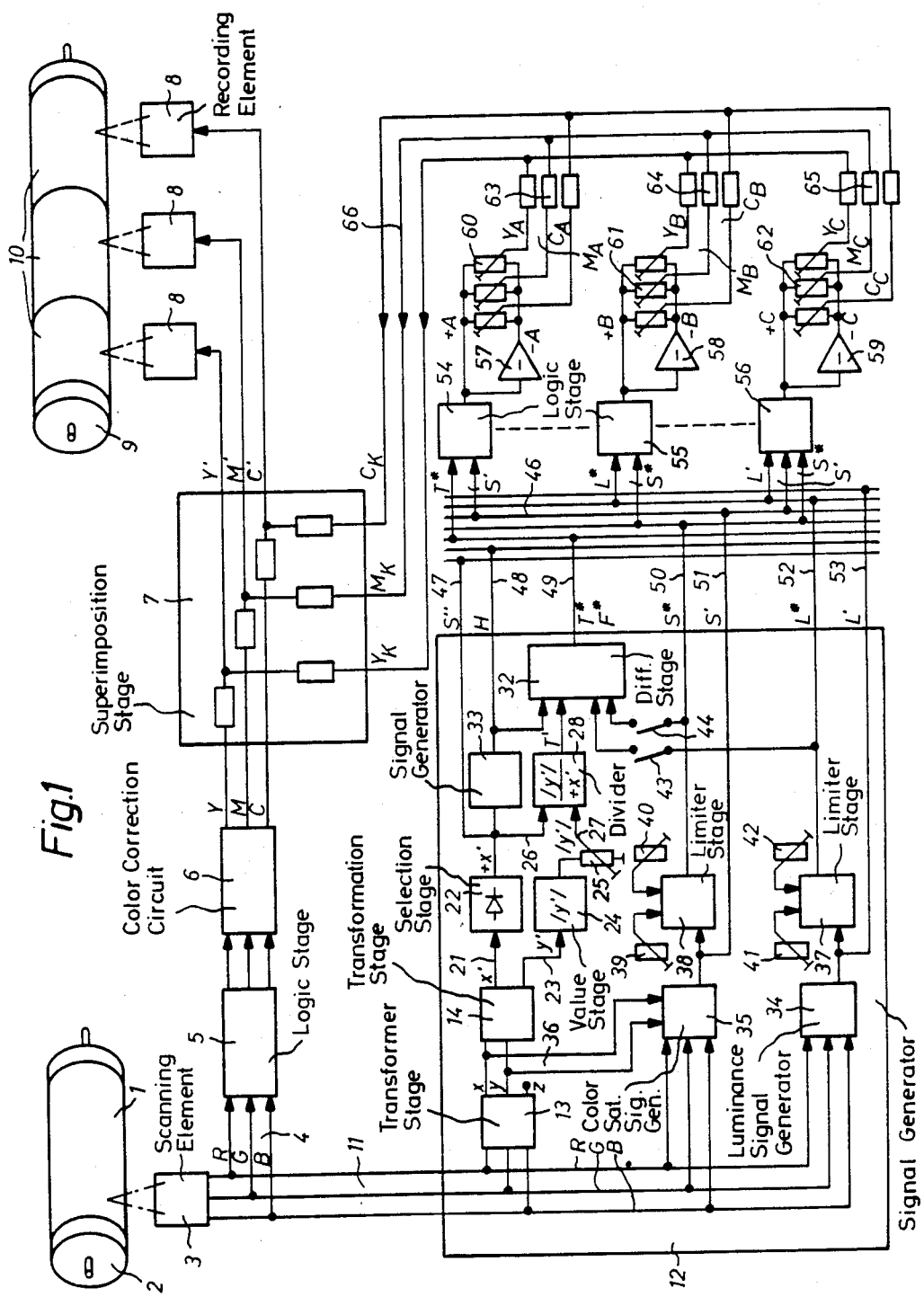
FIG. 1 is an illustrative embodiment of a circuit arrangement for selective color correction given a color scanner.

FIG. 1 shows an illustrative embodiment of a circuit arrangement for selective color correction given a color scanner, with which color separations can be produced for polychromatic mixed printing (paper printing).

Figure 8:
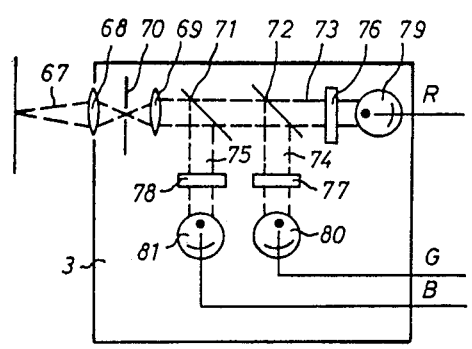
FIG. 8 is an illustrative embodiment of a scanning element.

A color original 1, from which color separations for polychromatic mixed printing are to be produced, is situated on a rotating scanner drum 2 of a color scanner (not shown in greater detail) and is trichromatically scanned point-by-point and line-by-line by an opto-electronic scanning element 3. The scan light reflected or transmitted by the scanned color original 1 is converted into the measured color value signals R, G, and B in the opto-electronic scanner element 3, with the assistance of color splitters, correction filters, and opto-electronic transducers. The measured color value signals are a measure for the intensities of the primary color components "red", "green", and "blue" of the scanned colors. The opto-electronic scanning element 3, which is displaceable axially relative to the scanner drum 2, is thus employed both for measuring individual color points in the color original 1 as well as for the area-wise point-by-point and line-by-line scanning of the color original 1 during the actual recording of the color separations. FIG. 8 shows an illustrative embodiment of an opto-electronic scanning element.

The measured color value signals R, G, and B proceed via lines 4 to a logarithmizing stage 5 in which they are logarithmized or partially logarithmized into measured color value signals R', G', and B' and, under given conditions, are also modified in a non-linear fashion according to a gradation function. The logarithmizing stage 5 is followed by a first color correction circuit 6 for basic color correction in which the measured color value signals R', G', and B' are converted according to the laws of subtractive color mixing into the color separation signals Y, M, and C for recording the color separations "yellow", "magenta" and "cyan" in 3 color printing and, are also converted into the color separation signal K for recording the color separation "black" in 4 color printing.

The basic-corrected color separation signals Y, M, and C are additively superimposed in a superimposition stage 7 by selective correction signals $Y_K$, $M_K$, and $C_K$. The color separation signals Y', M', and C' which have now been additionally selectively corrected proceed from the superimposition stage 7 to recording elements 8 in the form of write lamps whose brightnesses are modulated by the allocated color separation signals Y', M', or C'. Recording media 10, for example films, are chucked to a likewise rotating recording drum 9. The recording elements 8 move axially along the recording drum 9 in common and expose the attached films point-by-point and line-by-line. The exposed and developed films are the desired color separations for the polychromatic mixed printing.

The measured color value signals R, G, and B acquired in the scanning element 3 are forwarded via lines 11 to a signal generator 12.

The structure and function of the signal generator 12 shall be explained in greater detail below for that case in which a selected hue, referred to below as a correction hue, is to be selectively corrected in the production of the color separations. The measured color value signals R, G, and B on the lines 11 are first logarithmized or partially logarithmized in a transformer stage 13 and, under given conditions, are corrected according to a gradation curve. The logarithmized measured color value signals R', G', and B' are transformed into chrominance signals x and y and into a luminance signal z by means of a matrixing according to equations (1):

$$x = a_{11}R' + a_{12}G' + a_{13}B'$$

$$y = a_{21}R' + a_{22}G' + a_{23}B'$$

$$z = a_{31}R' + a_{32}G' + a_{33}B'. \quad (1)$$

The matrixing corresponds to a transformation of the color coordinates of the cartesian RGB color space into the color coordinates x, y, and z of the cartesian chrominance/luminance color space in which the color coordinates x and y identify the position of the color loci of the colors in the chrominance plane and the color coordinates z identify the luminance values of the colors.

The desired correction hue $T_0$ is first defined by means of prescribing a measured color value signal triad $R_0$, $G_0$, and $B_0$ or by means of prescribing its chrominance values $x_0$ and $y_0$ formed by matrixing or by measuring a sample point in the color original 1 with the assistance of the opto-electronic scanning element 3. The chrominance values $x_0$ and $y_0$ are inventively transformed into corresponding chrominance values $x'_0$ and $y'_0$ by means of a matrixing according to equations (2) which can be set to the selected correction hue $T_0$, whereby the transformation coefficients a, b, c, and d are determined such that the conditions $x'_0 > 0$ and $y'_0 = 0$ are met.

$$x'_0 = bx_0 + cy_0$$

$$y'_0 = -dx_0 + ey_0 \quad (2)$$

In the selected illustrative embodiment, transformation coefficients in the form $b = e = \cos \alpha$ and $c = -d = \sin \alpha$ are preferably employed, so that the matrixing corresponds to a rotation of an X'Y' color coordinate system by an angle $\alpha$ relative to the original XY color coordinate system in accordance with equations (3).

$$x'_0 = x_0 \cos \alpha + y_0 \sin \alpha$$

$$y'_0 = -x_0 \sin \alpha + y_0 \cos \alpha \quad (3)$$

The angle $\alpha_0$ required to meet the conditions $x'_0 > 0$ and $y'_0 = 0$ is defined in a transformation stage 14 by means of an automatic balancing operation given continuous checking of the conditions $x'_0 > 0$ and $y'_0 = 0$ in an internal monitoring stage of the transformation stage 14. Also, the angle $\alpha$ is modified until the monitoring stage has determined that the conditions are met. The angle $\alpha_0 =$ arc tan $y_0/x_0$ thus found corresponds to the correction hue $T_0$ and the X' axis of the X'Y' color coordinate system rotated by the angle $\alpha$ proceeds through the locus $F'_0$ of the correction hue $T_0$ which has been transformed into the chrominance plane. The described coordinate rotation corresponds to a rotation of the chrominance/luminance color space around the luminance axis (Z).

The determined angle $\alpha_0$ is stored in the transformation stage 14 and is used in the recording of the color separations for the continuous transformation of the chrominance signals x and y into the rotated chrominance signals x' and y' according to equations (4), whereby the rotated chrominance signal y' differs from zero for all hues of the scanned colors that deviate from the selected correction hue $T_0$ and is equal to zero for all hues that coincide with the selected correction hue $T_0$.

$$x' = cos\alpha_0 + y\, sin\alpha_0$$

$$y' = -x\, sin\alpha_0 + y\, cos\alpha_0 \qquad (4)$$

It lies within the framework of the invention to execute the matrixing according to equations (1) and (4) in one step.

Figure 9:
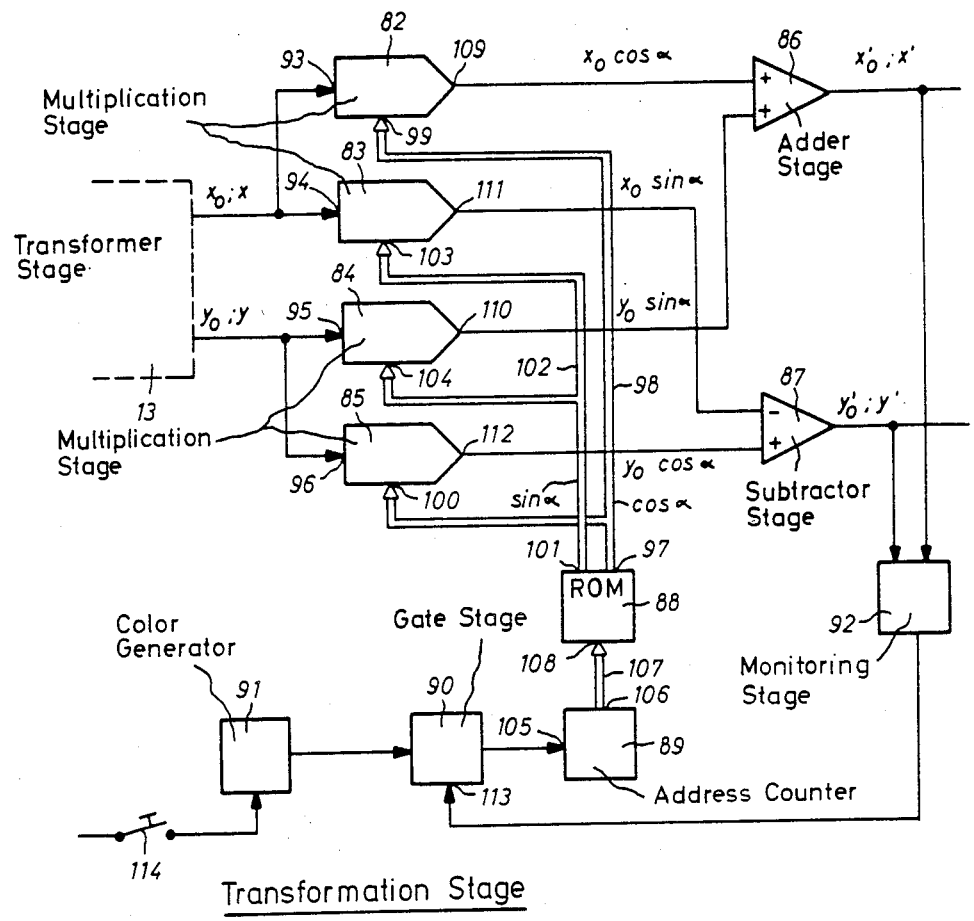
FIG. 9 is an illustrative embodiment of a transformation stage.

A detailed illustrative embodiment of the transformation stage 14 is specified in FIG. 9.

Figure 2:
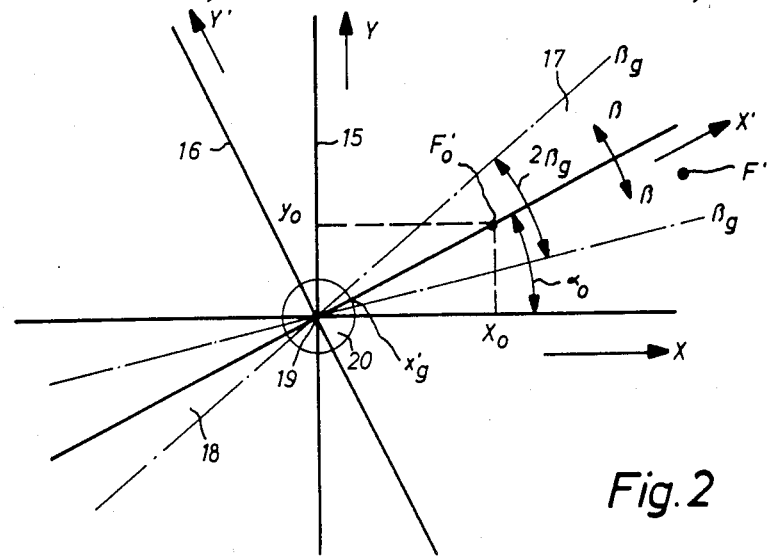
FIG. 2 is a graphic presentation of the coordinate rotation.

The above-described coordinate rotation shall be illustrated again with reference to a graphic presentation in FIG. 2.

FIG. 2 shows the chrominance plane of the chrominance/luminance color space with the XY color coordinate system 15, whereby the Z axis (gray axis) of the chrominance/luminance color space proceeds perpendicularly to the chrominance plane. A transformed color locus $F'_0$ of a selected correction hue $T_0$ is defined in the XY color coordinate system 15 by the color coordinates $x_0$ and $y_0$. The X'Y' color coordinate system 16 rotated by the angle $\alpha$ is shown at the same time, the X' axis thereof proceeding through the transformed color locus $F'_0$, so that the transformed color locus $F'_0$ in the rotated X'Y' color coordinate system 16 has the color coordinates $x'_0 > 0$ and $y'_0 = 0$. The angle $\alpha_0 =$ arc tan $y_0/x_0$ corresponds to the correction hue $T_0$ in the XY color coordinate system 15. At the same time, a sector-shaped hue region 17 around the correction hue $T_0$ is shown symmetrical to the X' axis of the rotated X'Y' color coordinate system 16, the critical angle $\beta_g$ (aperture angle $2\beta_g$) thereof being adjustable relative to the X' axis for the definition of the correction hues $T_0$. For an arbitrary color locus F' within the hue region 17, the rotated chrominance signal x' corresponds to the color saturation in a first approximation given a small angle $\alpha$ and the quotient $y'/x' =$ tan $\beta$ corresponds to the deviation of the hue of the scanned colors from the selected correction hue $T_0$, whereby the quotient increases with increasing deviation.

FIG. 2 also shows the complementary hues belonging to the definition correction hues, said complementary hues being within a sector 18 which has arisen by means of mirroring the hue region 17 at the Y' axis of the X'Y' color coordinate system 16. The rotated chrominance signal x' is positive for the defined hues but is negative for the complementary hues. It often proves necessary in the production of color separations to uniformly correct color fluctuations or progressions in the "gray" region. The plane of section 20 of such a cylindrical or barrel-shaped region around the gray axis 19 is also shown in FIG. 2, the radius thereof being defined by a boundary color saturation value $x'_g$.

Now referring again to FIG. 1, the rotated chrominance signal x' generated in the transformation stage 14 is supplied via a line 21 to a selection stage 22 in the form of a diode circuit which only transmits the positive values of the rotated chrominance signal x' as signal $+x'$. A signal thus always appears at the output of the selection stage 22 only when the hues of the colors scanned from the color original 1 lie on the side of the defined hue region 17 with reference to the Y' axis of the rotated X'Y' color coordinate system 16 (FIG. 2). Thus, complementary hues are not provided so that an exact separation of hues and complementary hues is achieved in an advantageous fashion. The signal $+x'$ is approximately a measure for the color saturation. The rotated chrominance signal y' proceeds from the transformation stage 14 via a line 23 to a value stage 24. The absolute value of the rotated chrominance signal y' is formed in the value stage 24 as signal $/y'/$.

The critical angle $\beta_g$ for the desired hue region 17 (FIG. 2) is determined as a result of setting the signal $/y'/$ in terms of amplitude by means of a potentiometer 25. The signals $+x'$ and $/y'/$ are supplied via lines 26 and 27 to a divider stage 28 in which a hue signal T' is acquired by means of quotient formation according to equation (5).

$$T = \frac{|y'|}{+x'} = \tan\beta \qquad (5)$$

The hue signal T' supplies an information about the value-wise deviation of the hue of a color scanned on the color original 1 from the correction hue $T_0$ in both directions, whereby the hue signal is T'=0 given hue coincidence ($\beta = 0$). The hue signal T' can also be modified in terms of amplitude and shape in the divider stage 28.

Figure 3:
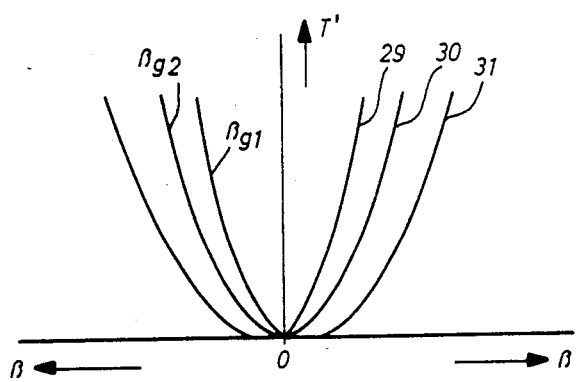
FIG. 3 is a further graphic presentation of signal curves.

FIG. 3 shows various curves of the hue signal T' dependent upon the angle $\beta$. The curves 29 and 30 result given differently set critical angles $\beta_g$ of the hue region 17 for that case in which no additional signal influencing occurs in the divider stage 28. The curve 31 results when the hue signal T' is flattened in the divider stage 28 in the region of small angles $\beta$.

A hue control signal T* is formed in a differentiation stage 32 from the hue signal T' and an auxiliary control signal H according to equation (6)

$$T^* = H - T. \qquad (6)$$

The auxiliary control signal H, which is generated in a signal generator 33, has, for example, a constant value $H_0$ which is then preferably selected at $H_o =$ tan $y_0/x_0$. As in the described illustrative embodiment, however, it is more advantageous to make the auxiliary control signal H dependent in a first approximation on the color saturation, i.e. on the signal $+x'$. In this case, the auxiliary control signal $H = f(x')$ has the constant value $H_0$ from a maximum color saturation value up to the proximity of the boundary color saturation value $x'_g$ already explained in FIG. 2, and then drops off and has the value zero between the boundary saturation value $x'_g$ and the gray axis ($x' = 0$). FIG. 10 shows an illustrative embodiment of the signal generator 33.

Figure 4:
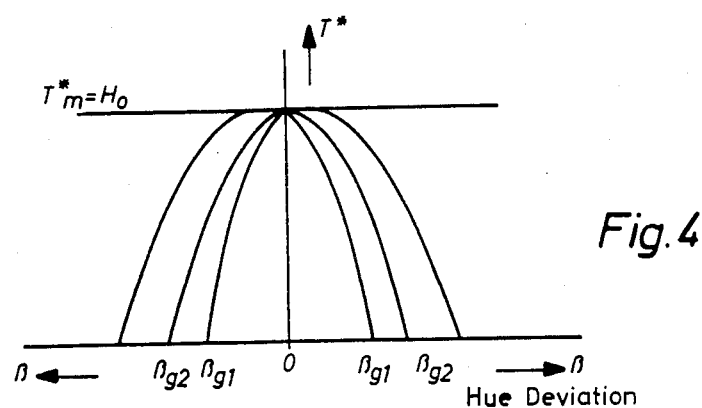
FIG. 4 is another graphic presentation of signal curves.

FIG. 4 shows various curves of the hue control signal T* dependent on the angle $\beta$ for various critical angles $\beta_g$ of the hue region 17 and for a constant auxiliary control signal $H_0$ or, respectively, for the region of the auxiliary control signal $H=f(x')$ lying between the boundary color saturation value $x'_g$ and the maximum color saturation value. The hue control signal T* has a maximum value $T^*_m=H_0$ for hues of the scanned colors which correspond to the selected correction hue $T_0(\beta=0)$, said maximum value exactly corresponding to the correction hue $T_0$ given $H_0=\tan y_0/x_0$. With increasing deviation of the hues of the scanned colors from the correction hue $T_0$, the hue control signal T* drops off and reaches the value T*=0 at the respective critical angle $\beta_g$ of the established hue regions 17.

Alternatively to setting the critical angle $\beta_g$ of the hue region 17 with the assistance of the potentiometer 25, the critical angle $\beta_g$ can also be set by means of amplitude modification of the hue signal T' in the divider stage 28 or of the value $H_0$ of the auxiliary control signal H in the signal generator 33.

Figure 5:
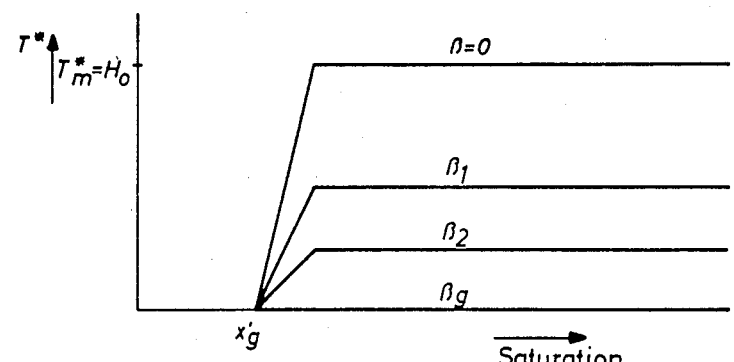
FIG. 5 is a further graphic presentation of signal curves.

FIG. 5 shows various curves of the hue control signal T* dependent on the signal x' or on the color saturation for that case in which the auxiliary control signal $H=f(x')$ and the angle $\beta$ are parameters. A definition toward "gray" is achieved in an advantageous fashion by means of the dependency of the hue control signal T* on the color saturation.

When a selected color of the color original 1, referred to below as a correction color, is to be selectively corrected in the production of the color separations, then a three-dimensional color region must be defined in the hue/color saturation/luminance color space since the sector-shaped hue region is additionally defined with respect to luminance and/or the color saturation and a color control signal F* is generated.

For definition or demarcation with respect to the luminance, a luminance signal L' is acquired in a luminance signal generator 34 to which the measured color value signals R, G, and B are supplied via the lines 11. This is acquired therein from at least one, and preferably from all three measured color values signals R, G, and B according to the relationship $L'=f_1R+f_2G=F_3B$. The luminance signal z formed in the transformer stage 13 can also be employed as luminance signal L' in case all three measured color value signals R, G, and B participate in the formation of the luminance signal L'. The luminance signal generator 34 can be omitted in this case.

For definition or demarcation with respect to color saturation, a color saturation signal generator 35 generates a color saturation signal S'. The color saturation signal S' can be acquired according to the equation $S'=\sqrt{x^2+y^2}$ from the chrominance signals x and y formed in the transformer stage 13, these being supplied to the color saturation signal generator 35 via the lines 36 shown with broken lines. In this case, the color saturation signal S' exactly reproduces the color saturation values of the scanned colors. In this case, the color saturation signal generator 35 contains corresponding arithmetic modules (squarers, adders, evolution units). which, however, do not permit a high working speed. In order to eliminate this difficulty, a color saturation signal S' approximated to the exact color saturation values is employed in an advantageous fashion, this approximated signal S' being derived in the color saturation signal generator 35 from the measured color values R, G, and B. The maximum and the minimum measured color values signal is continuously determined therein and the differences of the extreme values are formed, these approximately corresponding to the color saturation signal S' since the maximum measured color value signal of a scanned color respectively represents the color saturation and the minimum measured color value signal represents the gray scale of this color. Since the color saturation signal generator 35 now no longer contains the arithmetic modules, the recording rate in the production of color separations can be increased in an advantageous fashion by means of the specified signal formation. FIG. 11 shows an illustrative embodiment of the color saturation signal generator 35.

The luminance signal generator 34 is followed by a limiter stage 37 in which a luminance control signal L* is formed from the luminance signal L'. The color saturation signal generator 35 is likewise followed by a corresponding limiter stage 38 which converts the color saturation signal S' into a color saturation control signal S*. The formation of the luminance control signal L* and of the color saturation control signal S* occurs by means of shifting the cut-in points of the luminance signal L' or of the color saturation signal S' with the assistance of compensating voltages which can be set at potentiometers 39 and 40 or 41 and 42. At the same time, the luminance signal L' and the color saturation signal S' can also be varied in terms of amplitude in the limiter stages 37 and 38 and/or can be non-linearly varied according to gradation curves.

Figure 12:
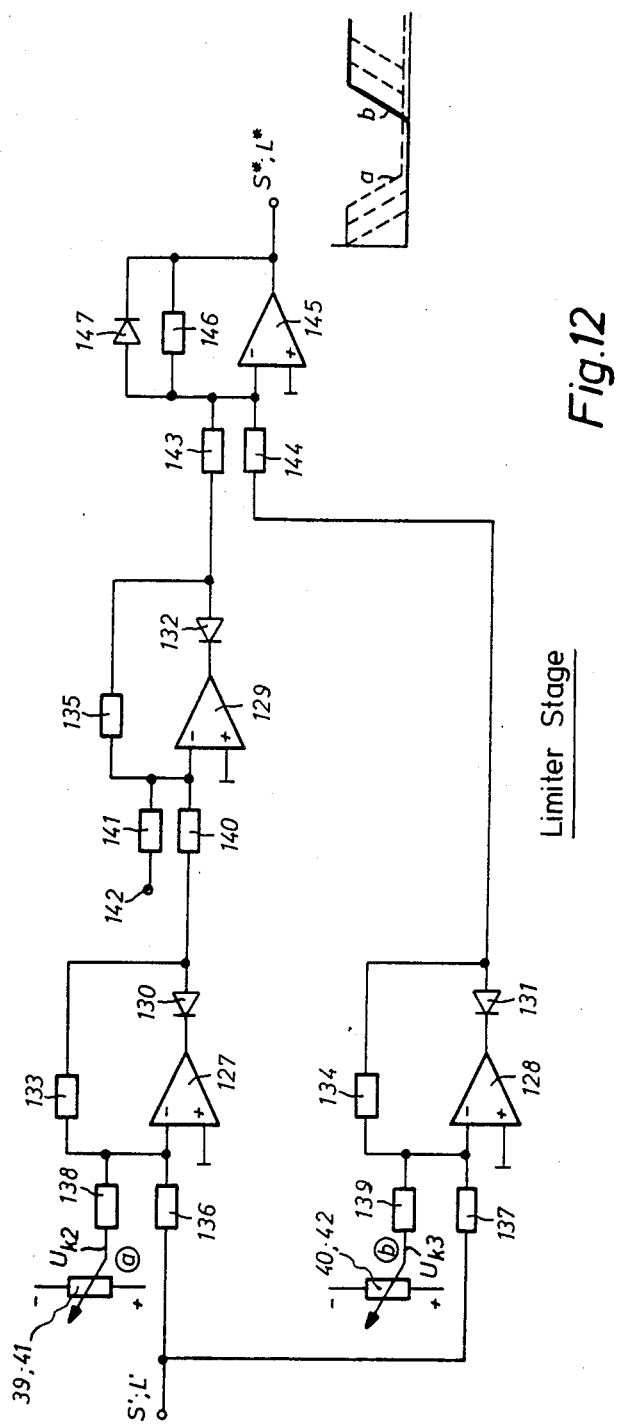
FIG. 12 is an illustrative embodiment of a limiter stage.

An illustrative embodiment of the identically constructed limiter stages 37 and 38 is shown in FIG. 12. The limiter stages 37 and 38, however, can also be constructed as simple inverters in which $L^*=\text{const.}-L'$ or, respectively, $S^*=\text{const.}-S'$ are formed.

Luminance control signal L* and/or color saturation control signal S* are forwarded via switches 43 and 44 to the differential stage 32 in which the color control signal F* is formed according to equation (7):

$$F^*=H-T'-L^*-S^*$$

or $$F^*=T^*-L^*-S^*. \tag{7}$$

Alternatively, the color control signal F* can also be acquired by means of multiplication of the corresponding signals. With the assistance of the potentiometers 39 and 40 or 41 and 42 at the limiter stages 37 and 38, the luminance and color saturation values can be determined at which the luminance and the color saturation of the scanned colors influence the curve of the color control signal F*. With the assistance of the switches 43 and 44, moreover a selection of the signals that are to participate in the formation of the color control signal F* can be undertaken by an operator.

The curve of the color control signal F* with respect to the hue of the scanned colors corresponds to the curve of the hue control signal T* shown in FIG. 4 when luminance and color saturation are left out of consideration.

Figure 6:
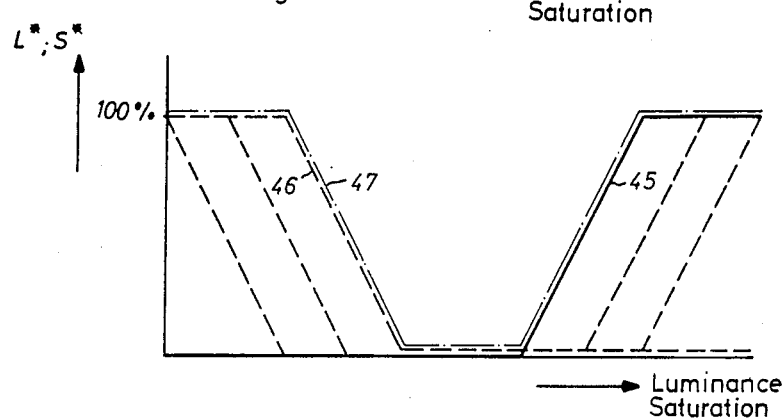
FIG. 6 is another graphic presentation of signal curves.

FIG. 6 shows various curves of the luminance control signal L* as a function of the luminance or of the color saturation control signal S* as a function of the color saturation that can be set by means of the potentiometers 39 through 42 at the limiter stages 37 and 38.

Figure 7:
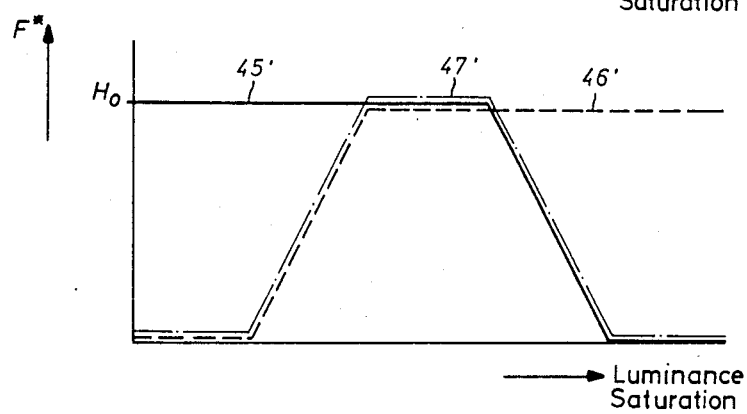
FIG. 7 is a further graphic presentation of signal curves.

FIG. 7 shows the corresponding curves of the color control signal F* dependent on the luminance or the color saturation. It is assumed for the purpose of simplifying the illustration that the scanned hue precisely corresponds to the selected correction hue $T_0$.

When it is essentially dark colors that are to be corrected, the curve 45a, for example, of the luminance control signal L*, is set with the assistance of one of the potentiometers at the limiter stage 37, whereby the curve 45'a of the color control signal F* is produced. In this case, the color control signal F* has a high signal level given dark colors and the signal limitation does not begin until lighter colors.

When, by contrast, it is essentially light colors that are to be corrected, the curve 45b, for example, is set with the assistance of the other potentiometer at the limiter stage 37 and the curve 45b' of the color control signal F* results. In this case, the color control signal F* has a high signal level given light colors, this being limited in the direction toward dark colors. Light and dark colors to be corrected can be exactly separated from one another in an advantageous fashion in this way.

The curve 45c of the luminance control signal L* can also be generated with the assistance of both potentiometers at the limiter stage 37 for the definition or demarcation of a luminance region. In this case, the color control signal F* has the curve 45'c, a limitation toward light and dark colors around colors of moderate luminance being thus achieved. Colors which essentially lie in or near the chrominance plane can thus be corrected.

By means of analogous setting of the potentiometers at the limiter stage 38, a definition of the colors to be corrected can also be undertaken with respect to lower or higher color saturation values as well as with respect to a color saturation region.

The signals formed in the signal generator 12 are forwarded to a switching matrix network, specifically the approximated color saturation signal S''=x' via a line 47, the auxiliary control signal H from the signal generator 33 via a line 48, either the hue control signal T* or the color control signal F* from the differential stage 32 via a line 49, the color saturation control signal S* from the limiter stage 38 via a line 50, the color saturation signal S' from the color saturation signal generator 35 via a line 51, the luminance control signal L* from the limiter stage 37 via a line 52, and the luminance signal L' from the luminance signal generator 34 via a line 53.

Those signals which are to participate in an expedient fashion in the formation of the selective correction signals with respect to hue, color saturation, or luminance are selected by an operator in the switching matrix network 46 and are forwarded to a plurality of logic stages which are connected following the switching matrix network 46, the logic stages 54, 55, and 56 in the illustrative embodiment. Positive output signals +A or +B and +C are respectively derived in the logic stages 54, 55, and 56 from at least one of the signals available in the switching matrix network 46, these positive output signals being simultaneously inverted into corresponding, negative output signals −A or −B and −C in inverters 57, 58, and 59. A trio of potentiometers 60, 61, and 62 is switched between every positive and negative output signal pair. A correction signal triad ($Y_A$, $M_A$, $C_A$), ($Y_B$, $M_B$, $C_B$) and ($Y_C$, $M_C$, $C_C$) is tapped at each trio of potentiometers 60, 61, and 62, whereby both the value as well as the operational sign of the correction signals, and thus the degree of correction and the direction of correction (positive/negative) are thus defined by means of the selected potentiometer setting.

The correction signal triads are united via summing resistors 63, 64, and 65 to form the selective correction signals $Y_K$, $M_K$, and $C_K$ for the color separation signals Y, M, and C, and are forwarded via lines 66 to the superimposition stage 7.

A few examples are intended to explain the formation of the selective correction signals $Y_K$, $M_K$, and $C_K$.

When a specific hue of the color original 1 is to be selectively corrected, the corresponding correction hue $T_0$, as extensively explained, is preset in the signal generator 12 and the selective correction signals $Y_K$, $M_K$, and $C_K$ are derived from the hue control signal T*.

When a color in the color original 1 is to be selectively corrected, the hue region is additionally defined or limited in the signal generator 12 with respect to luminance and color saturation and the selective correction signals $Y_K$, $M_K$, and $C_K$ are derived from the color control signal F*.

As proceeds from the illustrated curves of the hue control signal T* and of the color control signal F*, the selective correction signals $Y_K$, $M_K$, and $C_K$ have a greatest absolute value when scanning the correction hue in the color original. They decrease with increasing distance of the scanned hues from the set correction hue and reach the value zero when the scanned hues lie at the edge of the defined hue or color region. One thus obtains progressive selective correction signals which optimally match the color progressions in the hues or colors of the scanned color original 1.

It sometimes proves practical to correct a specific hue proportional to the color saturation. In this case, for example, the hue control signal T* and the color saturation signal S' are combined with one another in the logic stage 54. Selective correction signals $Y_K$, $M_K$, and $C_K$ which are nearly ineffective in the gray region up to the boundary color saturation value $x'_g$ thus result, whereas they are not influenced by the color saturation in the case of chromatic colors (high color saturation values) and only depend on the hue.

In another example, light colors, so-called pastel colors, are to be selectively corrected. It proves practical in this case to form corresponding correction signals $Y_B$, $M_B$, and $C_B$ in the logic stage 55 by means of multiplicative combination of the luminance signal L' with the color saturation signal S* which has arisen in the limiter stage 39 by inversion of the color saturation signal S'. The correction signals $Y_B$, $M_B$, and $C_B$ are then effective in a sub-color space. The areas of constant signal size have the shape of a cone whose point lies at black and whose cone axis is the gray axis, whereby the correction signals outside of the cone surface are zero and increase toward the inside.

In a further example, only the chromatic pastel colors are to be influenced, whereas the gray gradation is to be retained in unaltered fashion. It then proves practical to acquire correction signals $Y_C$, $M_C$ and $C_C$ in the logic stage 56 by means of a multiplicative combination of the luminance signal L', the color saturation signal S', and the color saturation control signal S* which has again arisen by means of inverting the color saturation signal S' in the limiter stage 39. The correction signals $Y_C$, $M_C$, and $C_C$ then again initially rise from the cone surface toward the inside and then decrease to zero with further proximity to the gray axis.

The invention, of course, is not restricted to the abovedescribed examples of the formation of selective correction signals.

FIG. 8 shows an illustrative embodiment of the opto-electronic scanning element 3. The scan light 67 reflected or transmitted by the color original 1 proceeds through lenses 68 and 69 and through a diaphragm 70 into the scanning element 3 and is split there into three sub-beams 73, 74, and 75 by means of two dichroitic color splitters 71 and 72. The sub-beams 73, 74, and 75 are incident through corrective color filters 76, 77, and 78 onto three opto-electronic transducers 79, 80, and 81 which convert the received sub-light into the primary measured color value signals R, G, and B in accordance with the intensities of the primary color components at the scanned colors.

FIG. 9 shows an illustrative embodiment of the transformation stage 14.

In the transformation stage 14, the chrominance signals $x_0$ and $y_0$ of the selected correction hue $T_0$ are rotated during a balancing operation by means of monotonous variation of the angle $\alpha$ until the rotated chrominance signals are $x'_0 > 0$ and $y'0 = 0$, whereby the angle $\alpha_g$ thereby found is retained. This coordinate rotation is executed according to equation (3).

The continuously generated chrominance signals x and y are then rotated according to equation (4) during the point-by-point and line-by-line scanning of the color original 1 to be selectively corrected.

The transformation stage 14 is composed of four multiplication stages 82, 83, 84, and 85, of an adder stage 86, of a subtractor stage 87, of a read-only memory 88, of an address counter 89, of a gate stage 90, of a clock generator 91, as well as of a monitoring stage 92.

The multiplication stages 82, 83, 84, and 85 are constructed in an advantageous fashion of multiplying digital-to-analog converters, for example of integrated modules of the type AD 7542 of Analog Devices. A selectable factor can be input via a data input into such a multiplying digital-to-analog converter in the form of digital values which are storable in an internal register. An analog signal pending at the input of the multiplying digital-to-analog converter is multiplied by the established factor, whereby the product is again available as an analog signal at the output of the multiplying digital-to-analog converter.

During the balancing operation, the chrominance signal $x_0$ coming from the transformer stage 13 (indicated with broken lines) is forwarded to the inputs 93 and 94 of the multiplication stages 82 and 83, whereas the chrominance signal $y_0$ proceeds to the inputs 95 and 96 of the multiplication stages 84 and 85.

The corresponding sine and cosine values for angular values from 0°-360° are stored in the read-only memory 88 as digital values $b = e = \cos \alpha$ and $c = d = \sin \alpha$. They are stored therein so as to be callable by the corresponding angular values as addresses of the read-only memory 88.

The data output 97 of the read-only memory 88 for the digital values $b = e = \cos \alpha$ is connected via a data bus 98 to the data inputs 99 and 100 of the multiplication stages 82 and 85, and the corresponding data output 101 for the digital values $c = d = \sin \alpha$ is connected via a data bus 102 to the data inputs 103 and 104 of the multiplication stages 83 and 84.

The switchable clock generator 91 is in communication with the clock input 105 of the address counter 89 via the gate stage 90. The output 106 of the address counter 89 is connected via an address bus 107 to the address input 108 of the read-only memory 88. The outputs 109 and 110 of the multiplication stages 82 and 84 are in communication with the adder stage 86, and the outputs 111 and 112 of the multiplication stages 83 and 85 are in communication with the subtractor stage 87. The output of the adder stage 86 and the output of the subtractor stage 87 are connected to the monitoring stage 92 for the conditions $x'_0 > 0$ and $y'_0 = 0$. The monitoring stage 92 is in communication with a control input 113 of the gate stage 90.

The balancing operation is initiated by means of switching the clock generator 91 on with the assistance of a key 114. The counting clock of the clock generator 91 is counted into the previously reset address counter 89, whereby the incrementing counter reading corresponds to monotonously increasing angular values $\alpha$. The address counter 89 successively calls in the addresses of the read-only memory 88. The digital values $\cos \alpha$ and $\sin \alpha$ belonging to the angular values $\alpha$ are transferred into the multiplication stages 83, 84, and 85 and are multiplied there by the corresponding chrominance signals $x_0$ and $y_0$. The individual products are added to or respectively subtracted from one another according to equation (3), so that the rotated chrominance signal $x'_0$ appears at the output of the adder stage 86 and the rotated chrominance signal $y'_0$ appears at the output of the subtractor stage 87. The rotated chrominance signals $x'_0$ and $y'_0$ are thus continuously checked by the monitoring stage 92. The monitoring stage 92 emits a control signal to the gate stage 90 when the conditions are met, the counting clock being thus interrupted. The counter reading thus reached in the address counter 89 corresponds to the desired angle $\alpha_0$.

FIG. 10a shows an illustrative embodiment of the signal generator 33 for generating the auxiliary control signal H dependent upon the signal x'.

The signal generator 33 is composed of an inverting amplifier 115 whose output is connected to the inverting input of the amplifier 115 via a diode 116 and via a network 117. The inverting input of the amplifier 115 is also connected with the signal x' via a first summing resistor 118 and is connected to a potentiometer 120 via a second summing resistor 119. A compensating voltage $U_{k1}$ which corresponds to the desired boundary color saturation value $x'_g$ can be set at the potentiometer 120. The non-inverting input of the amplifier 115 is applied to grounded potential via a resistor 121 and the anode of the diode 116 is applied to grounded potential via a resistor 122. The auxiliary control signal is H=0, given values of the signal x' that are lower in value than the compensating voltage $U_{k1}$. When the value of the signal x' reaches the compensating voltage $U_{k1}$, then the auxiliary control signal H rises in accordance with the gain set in the network 117 and then likewise reaches a limit value $H_0$ prescribed by the network 117.

FIG. 10b shows the curve of the auxiliary control signal H at the output of the signal generator 33.

FIG. 11 shows an illustrative embodiment of the color saturation signal generator 35 for generating the color saturation signal S' from the measured color value signals R, G, and B.

The measured color value signals R, G, and B supplied by the scanning element 1 (not shown in FIG. 11) are logarithmized or partially logarithmized in a logarithmizing stage 123 and are simultaneously supplied to a maximum selection stage 124 and a minimum selection stage 125 which respectively determine the maximum and minimum measured color value signal from the measured color value signals R, G, and B. The color saturation signal S' is formed in a subtractor stage 126 connected following the maximum selection stage 124 and the minimum selection stage 125, said color saturation signal S' being formed from the identified maximum and minimum measured color value signals as a differential signal which approximately corresponds to the color saturation.

FIG. 12 shows an illustrative embodiment of the limiter stage 37 or 38.

The limiter stage is composed of three identically constructed, inverting amplifiers 127, 128, and 129. The outputs of the amplifiers 127, 128, and 129 are respectively connected via diodes 130, 131, and 132 and via resistors 133, 134, and 135 to the inverting inputs of the amplifiers 127, 128, and 129. The inverting inputs of the amplifiers 127 and 128 are connected in common with the color saturation signal S' or the luminance signal L' via first summing resistors 136 and 137. The inverting input of the amplifier 127 is connected to the potentiometers 39 or 41 via a summing resistor 138, and the inverting input of the amplifier 128 is connected to the potentiometers 40 or 42 via a summing resistor 139. The inverting input of the amplifier 129 is connected to the output of the amplifier 127 via a summing resistor 140 and is connected to a positive voltage source 142 via a further summing resistor 141. The outputs of the amplifiers 128 and 129 communicate via summing resistors 143 and 144 with the inverting input of a limiting amplifier 145 whose output is coupled to the inverting input via a parallel connection of a resistor 146 and a limiting diode 147. The color saturation control signal S* or the luminance control signal L* having the curves shown in FIG. 6 is available at the output of the limiting amplifier 145. Compensating voltages $U_{k2}$ and $U_{k3}$ which define the cut-in points of the voltage limitation are set with the potentiometers 39 or 41 and 40, or respectively 42.

Although various minor changes and modifications might be proposed by those skilled in the art, it will be understood that we wish to include within the claims of the patent warranted hereon all such changes and modifications as reasonably come within our contribution to the art.

We claim as our invention:

1. A method for selective correction of hues and colors of a color original in the production of a color separation, comprising the steps of:
    (a) defining within a color space a hue $T_o$ to be selectively corrected or a color to be selectively corrected;
    (b) opto-electronically scanning the original point-by-point and line-by-line for generating measured color value signals R, G, B;
    (c) converting the measured color value signals R, G, B into corrected color signals Y, M, C, in a first correction operation;
    (d) transforming the measured color value signals R, G, B into chrominance signals x, y corresponding to a transformation of an RGB color space of the signals R, G, B into a chrominance/luminance color space, and deriving a hue signal T' from the chrominance signals x, y and which provides information about a value-wise deviation of the hues of the scanned colors from the hue $T_o$;
    (e) deriving a color saturation signal S' from the measured color value signals R, G, B identifying color saturation of the scanned colors;
    (f) deriving a luminance signal L' from the measured color value signals R, G, B identifying luminance of the scanned colors;
    (g) limiting the hue signal T' with an auxiliary control signal H and forming a respective limited hue signal T*, limiting the color saturation signal S' to a desired range to form a limited color saturation signal S*, and limiting the luminance signal L' to a desired range to form a limited luminance signal L*;
    (h) for correction hues based on the hue $T_o$ to be selectively corrected, employing the limited hue signal T*, or for correcting colors based on the color to be selectively corrected, employing the signals T*, S*, and L*;
    (i) generating selective correction signals $Y_K$, $M_K$, $C_K$ derived from at least one of the limited signals T*, S*, L* and non-limited signals T', S', L' for a color correction or at least one of the signals T* and T' for a hue correction; and
    (j) superimposing the selective correction signals $Y_K$, $M_K$, $C_K$ on the corrected color signals Y, M, C in a second correction operation to create color separation signals Y', M', and C' for use in producing the color separation.

2. A method according to claim 1 including the step of acquiring the selective correction signals $Y_K$, $M_K$, $C_K$ from a combination of at least one of the limited signals T*, S*, L* with at least one of the signals T', S', L'.

3. A method according to claim 1 wherein before the selective correction,
    (a) determining a color locus $F_0$ of the hue $T_0$ to be selectively corrected by color value signals $R_0$, $G_0$, $B_0$;
    (b) transforming the color locus $F_0$ of the hue $T_0$ to be corrected into a chrominance plane of the chrominance/luminance color space by a first transformation of its color value signals $R_0$, $G_0$, $B_0$ into chrominance values $x'_0$, $y'_0$ such that a transformed color locus $F'_0$ of the hue $T_0$ lies on one of the axes of an X'Y' color coordinate system in the chrominance plane, and retaining transformation coefficients required for the transformation;
    (c) continuously transforming color loci F of hues of the scanned colors into the chrominance plane by a second transformation of the measured color value signals R, G, B into chrominance values x', y', the color loci F being transformed into the chrominance plane with the previously identified transformation coefficients;
    (d) selecting those chrominance values x', y' whose corresponding, transformed color loci F' lie in a same half of the X'Y' color coordinate system as the transformed color locus $F'_0$ of the hue $T_0$ to be selectively corrected;
    (e) acquiring a quotient of absolute values of the selected chrominance values x', y' for formation of the hue signal T', the quotient respectively corresponding to a tangent of an angle $\beta$ described by a corresponding axis and a connecting line between coordinate origin and transformed color locus F' of the hue of a scanned color, the hue signal T' being a measure for a respective absolute value-wise hue deviation of the hue of a scanned color from the hue $T_0$ to be selectively corrected; and
    (f) acquiring the limited hue signal T* by a combination of a substantially constant auxiliary control signal H and the hue signal T', said limited hue signal T* having its highest value when scanning the hue $T_0$ to be selectively corrected and having a value zero when scanning a hue having a prescribed, maximum hue deviation, whereby a sector-shaped hue region is defined around the hue $T_0$ to be selectively corrected.

4. A method according to claim 3 wherein the auxiliary control signal H is dependent on the color saturation of the scanned colors in the color original.

5. A method according to claim 4 wherein the auxiliary control signal H is zero from a color saturation zero up to a boundary color saturation $x_g$ which defines an expanse of a gray region around a luminance axis Z of the chrominance/luminance color space, and has a constant value $H_0$ from the boundary color saturation $x_g$ up to a maximum color saturation.

6. A method according to claim 3 including the step of deforming the hue signal T' before a combination with the auxiliary control signal H.

7. A method according to claim 1 including the step of determining color value signals of the hue $T_0$ to be selectively corrected by opto-electronic measurement of a corresponding hue in the color original.

8. A method according to claim 1 including the step of setting a prescribed maximum hue deviation from the hue $T_0$ to be selectively corrected by amplitude modification of the chrominance values y' perpendicular to the corresponding axis.

9. A method according to claim 1, including the step of setting a prescribed maximum hue deviation from the hue $T_0$ to be selectively corrected by amplitude modification of the hue signal T'.

10. A method according to claim 1, including the step of setting the prescribed maximum hue deviation from the hue $T_0$ to be selectively corrected by amplitude modification of the auxiliary control signal H.

11. A method according to claim 1, including the step of acquiring the limited hue signal T* by forming a difference between the auxiliary control signal H and the hue signal T'.

12. A method according to claim 1, including the step of transforming measured color value signals $R_0$, $G_0$, $B_0$ as color value signals of a color locus $F_0$ of the hue $T_0$ to be selectively corrected into chrominance values $x'_0$, $y'_0$ by the steps of:

(a) matrixing the color value signals $R_0$, $G_0$, $B_0$ into chrominance values $x_0$, $y_0$ of an XY color coordinate system in a chrominance plane corresponding to a transformation of the RGB color space into the chrominance/luminance color space according to the equations $x_0 = a_{11}R_0 + a_{12}G_0 + a_{13}B_0$ $y_0 = a_{21}R_0 + a_{22}G_0 + a_{23}B_0$ (b) and by a coordinate rotation of the chrominance values $x_0$, $y_0$ of the XY color coordinate system into the chrominance values $x'_0$, $y'_0$ of an X'Y' color coordinates system rotated by an angle $\alpha$ relative to the XY color coordinate system, said coordinate rotation being dependent upon a position of a color locus $F_0$ of the hue $T_0$ to be selectively corrected within the chrominance plane and corresponding to a rotation of the chrominance/luminance color space around a luminance axis Z by an identified angle $\alpha$ according to the equations $x'_0 = x_0 \cos\alpha + y_0 \sin\alpha$ $y'_0 = -x_0 \sin\alpha + y_0 \cos\alpha$ where the angle $\alpha$ as a transformation coefficient is identified such that a transformed locus $F'_0$ of the hue $T_0$ to be selectively corrected lies on one of the axes of the X'Y' color coordinate system.

13. A method according to claim 12 including the step of varying the angle $\alpha$ by an automatic balancing until one of the chrominance values $x'_0$, $y'_0$ in the X'Y' color coordinate system becomes zero so that the angle $\alpha_0$ thus identified is retained.

14. A method according to claim 1 including the step of transforming measured color value signals R, G, B of hues of scanned colors into chrominance values x', y' of a transformed color loci F' by the steps of:

(a) matrixing the measured color value signals R, G, B into the chrominance values x, y of an XY color coordinate system in the chrominance plane corresponding to a transformation of the RGB color space into the chrominance/luminance color space according to the equations $x = a_{11}R + a_{12}G + a_{13}B$ $y = a_{21}R + a_{22}G + a_{23}B$ (b) and by a coordinate rotation of the chrominance values x, y of the XY color coordinate system into the chrominance values x', y' of an X'Y' color coordinate system by an identified angle $\alpha_0$ according to the equations $x' = x \cos\alpha_0 + y \sin\alpha_0$ $y' = -x \sin\alpha_0 + y \cos\alpha_0$.

15. A method according to claim 1 wherein for generating the color saturation signal S':

(a) respectively selecting maximum and minimum measured color value signals from the measured color value signals R, G, B; and (b) forming the color saturation signal S' from the differences between maximum and minimum measured color value signals.

16. A circuit for selective correction of hues and colors of a color original in the production of color separations, comprising:

(a) an opto-electronic scanning element means for generating measured color value signals R, G, B;

(b) a first correction circuit means connected to the scanning element means for generating corrected color signals Y, M, C;

(c) a second correction circuit means connected to the scanning element means for generating selective correction signals $Y_K$, $M_K$, $C_K$; and (d) a superimposition stage means connected to the first and to the second correction circuit means for superimposition of the corrected color signals Y, M, C and the selective correction signals $Y_K$, $M_K$, $C_K$;

said second correction circuit means comprising:

(i) a transformation circuit means connected to the scanning element means for transforming the measured color value signals R, G, B and measured color value signals $R_0$, $G_0$, $B_0$ corresponding to a color locus $F_0$ of a hue $T_0$ to be selectively corrected into chrominance values and x', y' and $x'_0$, $y'_0$ respectively of an X'Y' color coordinate system in a chrominance plane of a chrominance/luminance color space;

(ii) a selection and absolute value circuit means connected to the transformation circuit means for selection and absolute formation of chrominance values $+x'$, $/y'/$;

(iii) setting means for defining a range around the hue $T_0$ to be selectively corrected associated with the selection and absolute value circuit means;

(iv) a divider stage means in communication with the setting means for formation of a hue signal T' from the absolute values of the selected chrominance values $+x'$, $/y'/$;

(v) a signal generator means for generating an auxiliary control signal H;

(vi) means for combining the signal H and signal T' to form a limited hue signal T*;

(vii) a color saturation signal generator means connected with the scanning element means for generating a color saturation signal S' from the measured color value signals R, G, B;

(viii) a luminance signal generator means connected to the scanning element means for generating a luminance signal L' from the measured color value signals R, G, B;

(ix) variable limiter stage means connected following the color saturation signal generator means and the luminance signal generator means for forming a limited luminance signal L* and a limited saturation signal S*; and (x) logic circuit means for formation of the selective correction signals $Y_K$, $M_K$, $C_K$ based on at least one of the signals T*, L*, S*, T', L', S' for a color correction and based on at least one of the signals T* and T' for a hue correction.

17. An apparatus for selective correction of hues and colors of a color original in production of a color separation, comprising:

(a) means for opto-electronically scanning the color original point-by-point and line-by-line for generating measured color value signals R, G, B;

(b) means for converting the measured color value signals R, G, B into corrected color signals Y, M, C in a first correction operation;

(c) means for defining hue $T_0$ to be selectively corrected or of a color to be selectively corrected within a color space and generating selective correction signals $Y_K$, $M_K$, $C_K$ when a hue or color of the scanned color original has a given comparison with the hue $T_0$ or the color to be selectively corrected;

(d) means for superimposing the selective correction signals $Y_K$, $M_K$, $C_K$ on the corrected color signals Y, M,C in a second correction operation;

(e) means for transforming the measured color value signals R, G, B into chrominance signals x, y corresponding to a transformation of the RGB color space into a chrominance/luminance color space, and generating a hue signal T' which provides information about a value-wise deviation of hues of scanned colors from the correction hue $T_0$;

(f) means for deriving a color saturation signal S' identifying color saturation of the scanned colors from the measured color value signals R, G, B, and deriving a luminance signal L' identifying luminance of the scanned colors from the measured color value signals R, G, B;

(g) means for limiting the hue signal T', the color saturation signal S', and the luminance signal L' to create limited signals T*, S*, and L* which fall within desired ranges; and (h) means for acquiring the selective correction signals $Y_K$, $M_K$, $C_K$ based on the limited signals T*, S*, L* for a color correction or signal T* for a hue correction.

* * * * *